US011411906B2

(12) United States Patent
Kim et al.

(10) Patent No.: US 11,411,906 B2
(45) Date of Patent: Aug. 9, 2022

(54) METHOD AND SYSTEM FOR PROVIDING ANSWER MESSAGE TO QUERY MESSAGE

(71) Applicant: LINE PLUS CORPORATION, Seongnam-si (KR)

(72) Inventors: Sungwhan Kim, Seongnam-si (KR);
Chaewon Jung, Seongnam-si (KR);
Hyun Jung Lee, Seongnam-si (KR);
Seo Hyun Cho, Seongnam-si (KR);
Eun Jung Joung, Seongnam-si (KR)

(73) Assignee: LINE PLUS CORPORATION, Seongnam-si (KR)

( * ) Notice: Subject to any disclaimer, the term of this patent is extended or adjusted under 35 U.S.C. 154(b) by 0 days.

(21) Appl. No.: 16/909,480

(22) Filed: Jun. 23, 2020

(65) Prior Publication Data
US 2020/0403949 A1 Dec. 24, 2020

(30) Foreign Application Priority Data

Jun. 24, 2019 (KR) .......................... 10-2019-0074809

(51) Int. Cl.
*H04L 51/00* (2022.01)
*H04L 12/18* (2006.01)
*H04L 51/046* (2022.01)

(52) U.S. Cl.
CPC .......... *H04L 51/14* (2013.01); *H04L 12/1813* (2013.01); *H04L 51/046* (2013.01)

(58) Field of Classification Search
CPC .... H04L 51/14; H04L 12/1813; H04L 51/046
USPC ........................................................ 709/206
See application file for complete search history.

(56) References Cited

U.S. PATENT DOCUMENTS

| | | | | |
|---|---|---|---|---|
| 2003/0090518 A1* | 5/2003 | Chien | ............... | H04M 1/72436 715/758 |
| 2011/0246910 A1* | 10/2011 | Moxley | ................. | G06F 16/951 715/758 |
| 2012/0173992 A1* | 7/2012 | D'Angelo | .............. | G06Q 10/10 715/751 |
| 2013/0018909 A1* | 1/2013 | Dicker | ................... | G06Q 10/10 707/758 |
| 2014/0215361 A1* | 7/2014 | Hwang | ............ | H04N 21/23614 715/758 |
| 2015/0026269 A1* | 1/2015 | Canton | ................... | H04L 51/36 709/206 |
| 2016/0212072 A1* | 7/2016 | Lee | ......................... | H04L 51/28 |
| 2016/0337291 A1* | 11/2016 | Park | ........................ | H04L 51/32 |
| 2020/0014641 A1* | 1/2020 | Kwon | ................... | H04L 51/046 |

(Continued)

FOREIGN PATENT DOCUMENTS

KR 10-2014-0096485 8/2014

*Primary Examiner* — Meng Vang
*Assistant Examiner* — Chong G Kim
(74) *Attorney, Agent, or Firm* — Staas & Halsey LLP

(57) ABSTRACT

Provided is a method and system for providing an answer message to a query message. An answer message providing method may include managing a plurality of chatrooms of an instant messaging service; receiving a query message in a preset form from a first user of a first chatroom among the plurality of chatrooms; forwarding the query message to second users through the instant messaging service; receiving an answer message to the query message from at least one of the second users; and providing the received answer message to be displayed through the first chatroom.

13 Claims, 15 Drawing Sheets

(56) References Cited

U.S. PATENT DOCUMENTS

2020/0073982 A1* 3/2020 Kolluri Venkata Sesha ................ G06F 11/3082
2020/0372055 A1* 11/2020 Joko ....................... G06F 40/30

* cited by examiner

METHOD AND SYSTEM FOR PROVIDING ANSWER MESSAGE TO QUERY MESSAGE

CROSS-REFERENCE TO RELATED APPLICATION(S)

This U.S. non-provisional application claims the benefit of priority under 35 U.S.C. § 119 to Korean Patent Application No. 10-2019-0074809 filed on Jun. 24, 2019, in the Korean Intellectual Property Office (KIPO), the entire contents of which are incorporated herein by reference.

BACKGROUND

Field

One or more example embodiments relate to a method and system for providing an answer message to a query message.

Description of Related Art

A chatroom refers to an Internet space in which users may chat with each other online. The chatroom may include a chatroom that is opened between users having a mutual personal relationship established to allow the users to exchange contents online and may also include a chatroom that allows strangers to gather and exchange contents based on a specific subject. Korean Laid-Open Publication No. 10-2014-0096485 describes an apparatus, method, and computer-readable record medium for sending contents simultaneously through a plurality of chatting windows of a messenger service.

SUMMARY

One or more example embodiments provide a method and system for providing an answer message that may forward a query created in a chatroom of an instant messaging service to a plurality of unspecific users using the instant messaging service through the instant messaging service and may forward answers each in a form of an answer message from the plurality of unspecific users to the chatroom in which the query is created, such that users may send and receive queries and answers with the plurality of unspecific users in the chatroom.

According to an aspect of at least one example embodiment, there is provided an answer message providing method of a computer apparatus including at least one processor, the method including, by the at least one processor, managing a plurality of chatrooms of an instant messaging service; receiving a query message in a preset form from a first user of a first chatroom among the plurality of chatrooms; forwarding the query message outside of the first chatroom to second users through the instant messaging service; receiving an answer message to the query message from at least one of the second users; and providing the received answer message to be displayed through the first chatroom.

The forwarding of the query message to the second users may include selecting the second users from among users of the instant messaging service; opening second chatrooms joined by the selected second users, respectively; and forwarding the query message to each of the second chatrooms.

The selecting of the second users may include allocating a query field of the query message by analyzing content of the query message or allocating the query field of the query message in response to an input or a selection from the first user; and selecting, as the second users, users to which the allocated query field is designated as a special field.

The forwarding of the query message to the second users may include creating a page for displaying query messages in the instant messaging service; and providing the query messages to a plurality of unspecific users accessing the page through the page.

The creating of the page may include allocating a query field of the query message by analyzing content of the query message or allocating the query field of the query message in response to an input or a selection from the first user; and creating the page such that the query messages are distinguishably displayed for each allocated query field.

The answer message providing method may further include, by the at least one processor, further displaying the answer message in association with the query message displayed on the page.

The answer message may be displayed in association with the query message in the first chatroom.

The answer message providing method may further include, by the at least one processor, receiving a feedback from participants of the first chatroom with respect to the answer message displayed through the first chatroom; and selecting at least one answer message from among answer messages provided to the first chatroom or selecting at least one second user providing answer content of the selected at least one answer message, based on the feedback.

The answer message providing method may further include, by the at least one processor, displaying the selected at least one answer message to be distinguished from other answer messages or determining a reward to be provided to the selected at least one second user.

According to an aspect of at least one example embodiment, there is provided an answer message providing method of a computer apparatus including at least one processor, the method including, by the at least one processor, receiving a query message from a first user through a query function provided from a first chatroom of an instant messaging service; sending the received query message to a server that provides the instant messaging service; receiving, from the server, an answer message acquired in response to forwarding the query message from the server to each of second users through the instant messaging service; and displaying the answer message through the first chatroom.

According to an aspect of at least one example embodiment, there is provided a non-transitory computer-readable record medium storing instructions that, when executed by a processor, cause the processor to perform the method.

According to an aspect of at least one example embodiment, there is provided a computer apparatus including at least one processor configured to execute computer-readable instructions. The at least one processor is further configured to manage a plurality of chatrooms of an instant messaging service, receive a query message in a preset form from a first user of a first chatroom among the plurality of chatrooms, forward the query message to second users through the instant messaging service, receive an answer message to the query message from at least one of the second users, and provide the received answer message to be displayed through the first chatroom.

According to an aspect of at least one example embodiment, there is provided a computer apparatus including at least one processor configured to execute computer-readable instructions. The at least one computer processor is further configured to receive a query message from a first user through a query function provided from a first chatroom of an instant messaging service, send the received query message to a server that provides the instant messaging service, receive, from the server, an answer message acquired in response to forwarding the query message from the server to each of second users through the instant messaging service, and display the answer message through the first chatroom.

According to some example embodiments, since a query created in a chatroom of an instant messaging service is forwarded to a plurality of unspecific users using the instant messaging service through the instant messaging service and answers each in a form of an answer message from the plurality of unspecific users are forwarded to the chatroom in which the query is created, users may send and receive queries and answers with the plurality of unspecific users in the chatroom.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
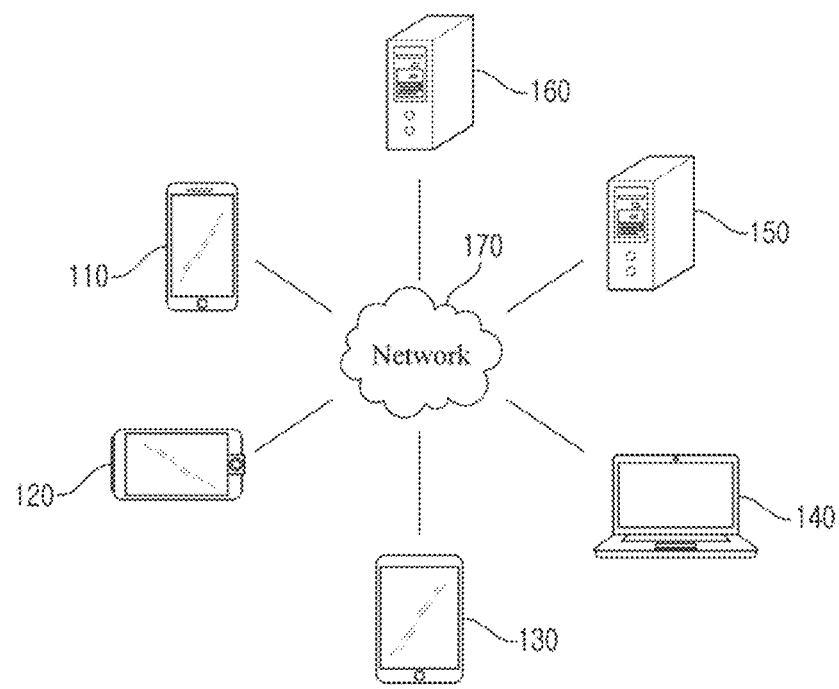
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

An answer message providing system according to the example embodiments may be performed by at least one computer apparatus, and an answer message providing method according to the example embodiments may be performed through at least one computer apparatus that implements the answer message providing system. Here, a computer program according to the example embodiments may be installed and run on the computer apparatus, and the computer apparatus may perform the answer message providing method according to the example embodiments under control of the executed computer program. Here, the computer program may be stored in a non-transitory computer-readable record medium to perform the answer message providing method on a computer in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided to describe one example among environments applicable to the example embodiments. An environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that includes a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service (e.g., a messaging service, a mail service, a social network service, a map service, a translation service, a financial service, a payment service, a search service, and a content providing service) to the plurality of electronic devices 110, 120, 130, and 140 connected over the network 170.

Figure 2:
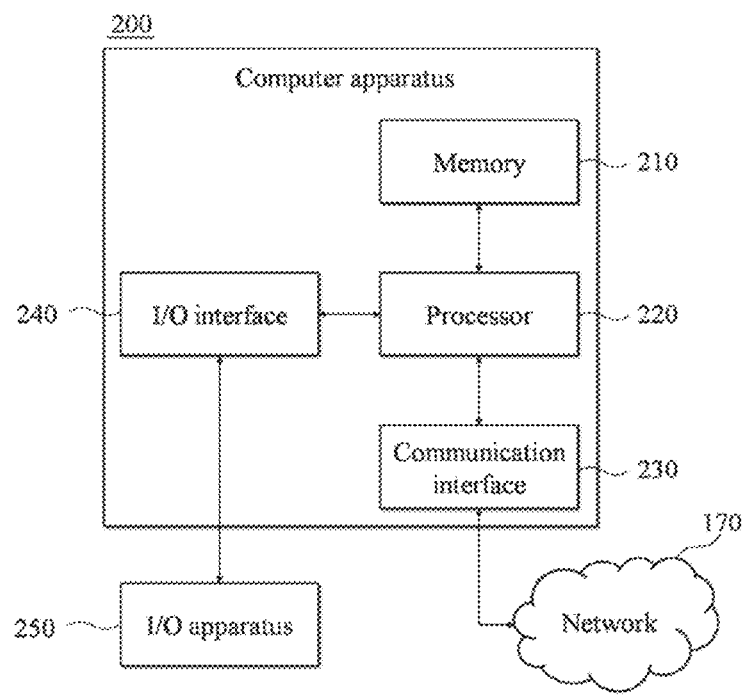
FIG. 2 is a diagram illustrating an example of a computer apparatus according to at least one example embodiment.

FIG. 2 is a block diagram illustrating an example of a computer apparatus according to at least one example embodiment. For example, each of the plurality of electronic devices 110, 120, 130, and 140 or each of the plurality of servers 150 and 160 may be implemented using a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as random access (RAM), read only memory (ROM), and a disc drive, as a non-transitory computer-readable storage medium. Here, the permanent mass storage device, such as ROM and disc drive, may be included in the computer apparatus 200 as a separate permanent storage device different from the memory 210. Also, an operating system (OS) and at least one program code may be stored in the memory 210. Such software components may be loaded from another non-transitory computer-readable storage medium to the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230, instead of, or in addition to, the non-transitory computer-readable storage medium. For example, the software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to a program code stored in a storage device, such as the memory 220.

The communication interface 230 may provide a function for communication between the computer apparatus 200 and another apparatus, for example, the aforementioned storage devices, over the network 170. For example, the processor 220 of the computer apparatus 200 may transfer data, a file, a request or an instruction created based on the program code stored in the storage device, such as the memory 220, etc., to other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used for interface with an I/O apparatus 250. For example, an input device may include a device, such as a microphone, a keyboard, and a mouse, and an output device may include a device, such as a display device and a speaker. As another example, the I/O interface 240 may be a device for interface with an apparatus in which an input function and an output function are integrated into a single function, such as a touchscreen. The I/O apparatus 250 may be configured as a single apparatus with the computer apparatus 200.

According to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB), and the like.

FIG. 3A through FIG. 3E illustrate an example of a process of providing an answer message to a query message according to at least one example embodiment. A first user may open a chatroom or may join an opened chatroom through a terminal of the first user.

Figure 3A:
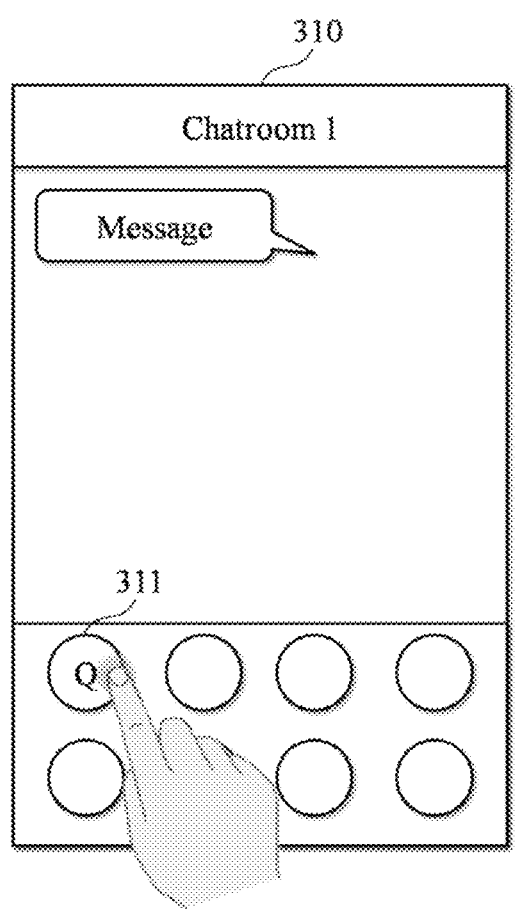
FIG. 3A illustrates an example of a chatroom 1 providing a query function according to at least one example embodiment.

FIG. 3A illustrate first screen 310 of chatroom 1 of the first user. Here, the example embodiment may provide a query function that enables the first user to create a query message through the chatroom 1. For example, the first screen 310 represents an example in which a user activates a query function by pressing a button 311 for receiving the query function.

Figure 3B:
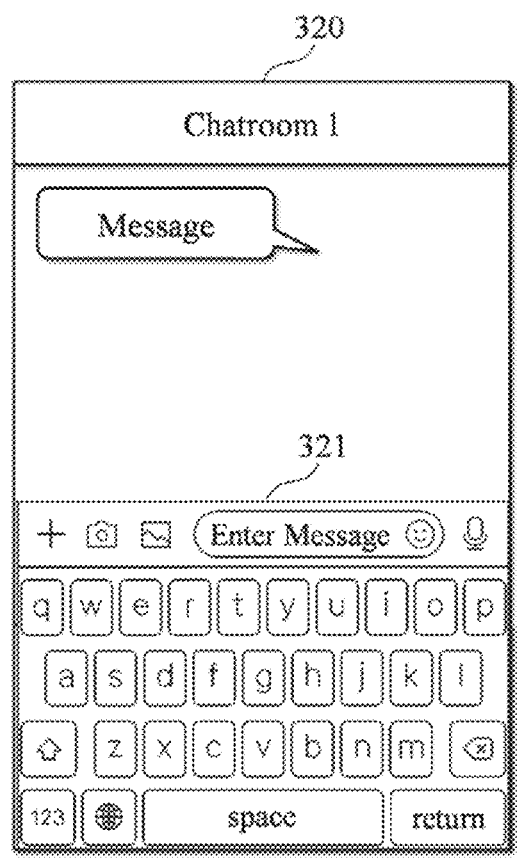
FIG. 3B illustrates an example of a chatroom 1 providing a keypad in response to activation of a query function according to at least one example embodiment.

FIG. 3B illustrate second screen 320 of the chatroom 1 of the first user. Here, the second screen 320 represents an example in which a keypad 321 for receiving an input of a text from the first user is displayed in response to activation of the query function. In this case, content input from the first user through the keypad 321 may be query content. Depending on example embodiments, the query content may be input using various methods, such as an input through a voice recognition function.

Figure 3C:
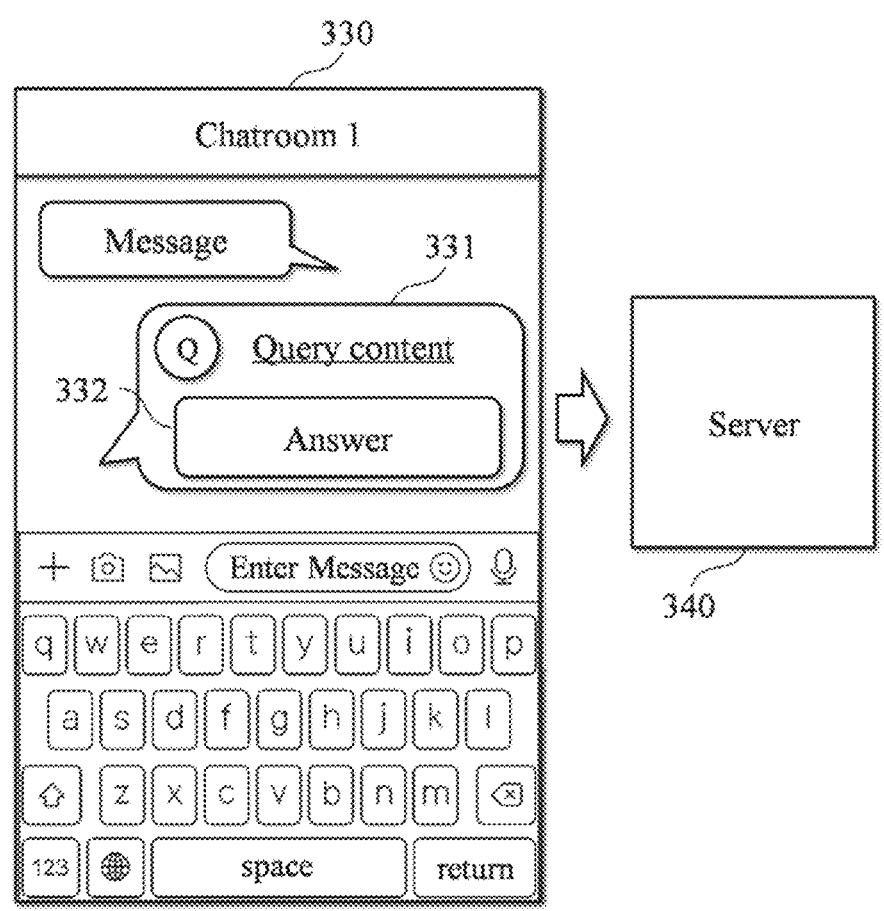
FIG. 3C illustrates an example of a chatroom 1 on which a query message displayed according to at least one example embodiment.

FIG. 3C illustrate third screen 330 of the chatroom 1 of the first user. The third screen 330 represents an example of a query message 331. The query message 331 may include query content input from the first user and may include an answer function 332 for creating an answer message to the query content depending on example embodiments. For example, if the user receives the query message 331 and selects the answer function 332, a user interface for receiving the answer content may be provided. Also, the query message 331 may be sent to a server 340 that provides an instant messaging service. In this case, the server 340 may provide the query message 331 to at least one second user. The query message 331 may be forwarded to a second user using a variety of methods.

Figure 3D:
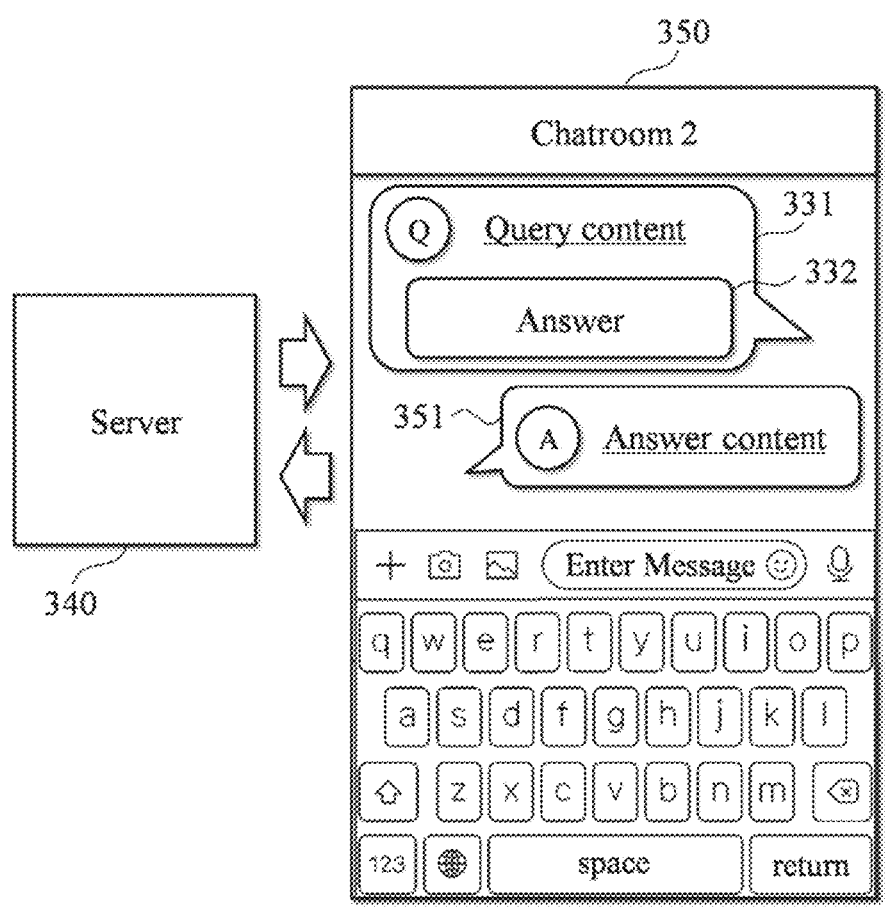
FIG. 3D illustrates an example of a chatroom 2 on which a query message displayed according to at least one example embodiment.

FIG. 3D illustrates an example of forwarding the query message 331 through chatroom 2 of the second user. In detail, the server 340 may select second users from among users of the instant messaging service, may open chatrooms joined by the selected second users, respectively, and may forward the query message 331 to each of the chatrooms. Referring to FIG. 3D, a fourth screen 350 of chatroom 2 is displayed as one of the chatrooms opened for the second users. The query message 331 may be displayed on the fourth screen 350. If the second user inputs answer content through the answer function 332 included in the query message 331, an answer message 351 to the query message 331 may be forwarded to the server 340.

Figure 3E:
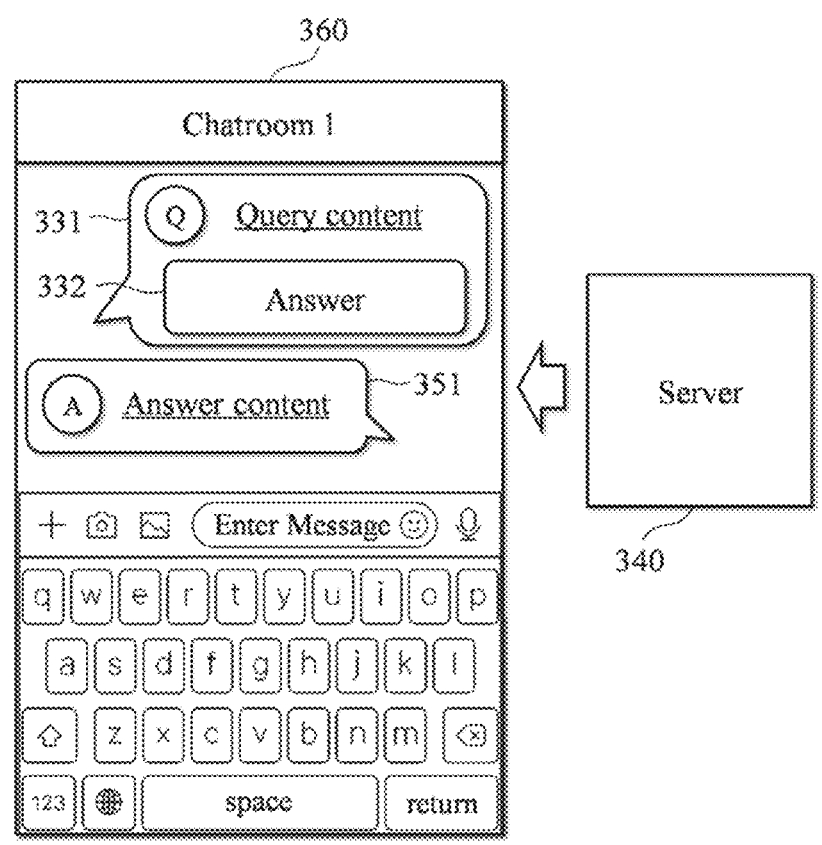
FIG. 3E illustrates an example of a chatroom 1 on which an answer message displayed according to at least one example embodiment.

FIG. 3E illustrates an example of a fifth screen 360 of the chatroom 1. The answer message 351 may be displayed in the chatroom 1 in association with the query message 331.

The query message 331 may be forwarded to each of a plurality of second users, and a plurality of answer messages may be forwarded from the second users to the server 340. In this case, the plurality of answer messages may be displayed in the chatroom 1.

Also, as described above, the query message 331 may be forwarded to each of the second users using a variety of methods.

Figure 4:
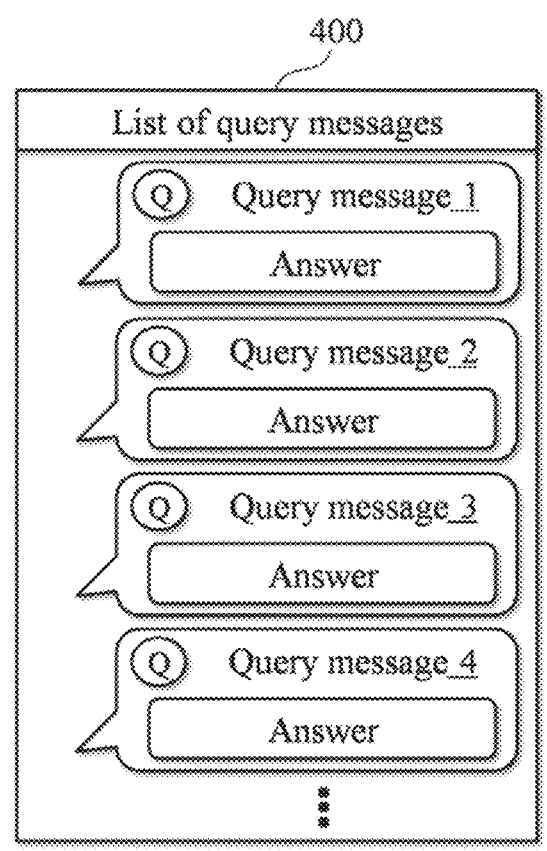
FIG. 4 illustrates an example of a page on which a query message is displayed according to at least one example embodiment.

FIG. 4 illustrates an example of a page on which a query message is displayed according to at least one example embodiment. FIG. 4 illustrates an example of a page 400 on which a list of query messages is displayed. In this case, second users receiving the query messages may be a plurality of unspecific second users accessing the page 400.

Depending on example embodiments, the query messages may be classified for each query field and displayed on a corresponding page or pages. The query field may be allocated by the server 340 by analyzing the query messages, or may be input from or selected by the user that creates a query message when creating the query message. In this case, the server 340 may classify each of the query messages for each query field and may create and provide a page or pages for displaying query messages for each query field.

The page 400 may refer to a page in the instant messaging service. For example, a button or a link for access to the page 400 may be set on a home screen of the instant messaging service, and the page 400 may be provided to users through a user interface, such the button or the like. A user connected to the page 400, that is, a second user may create answer content to a query message desired by the second user using an answer function included in each of the query messages. The answer message containing the answer content may be created and then forwarded to a chatroom of a user that creates the corresponding query message through the server 340.

Figure 5:
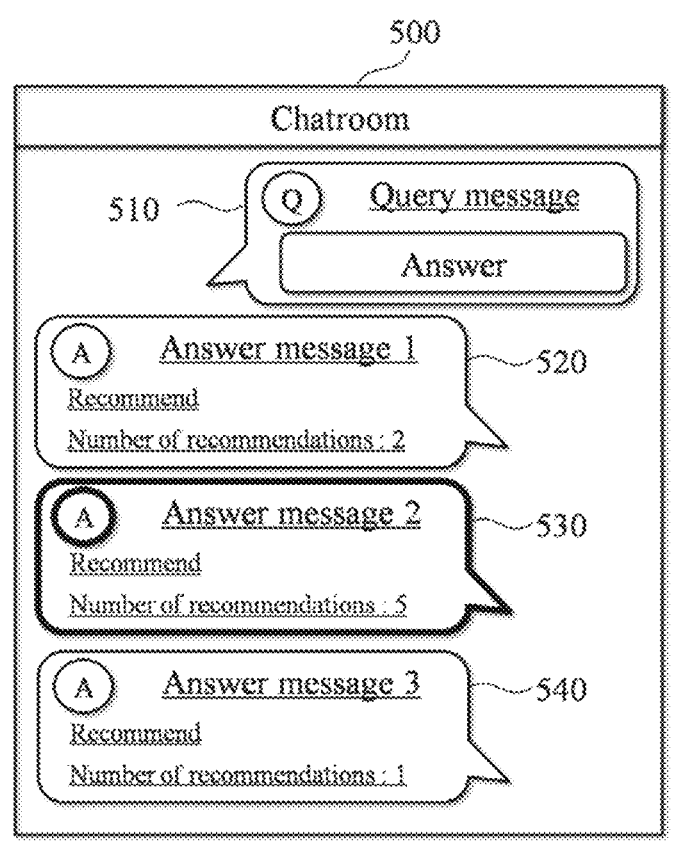
FIG. 5 illustrates an example of providing a feedback about an answer message according to at least one example embodiment.

FIG. 5 illustrates an example of providing a feedback about an answer message according to at least one example embodiment. Referring to FIG. 5, a screen 500 of a chatroom represents an example in which three answer messages, an answer message 1 520, an answer message 2 530, and an answer message 3 540, are forwarded in association with a query message 510. Here, participants joining the chatroom may recommend a desired answer message among the forwarded answer messages. Referring to the screen 500, the answer message 1 520 is recommended by two participants, the answer message 2 530 is recommended by five participants, and the answer message 3 540 is recommended by one participant. Here, the answer message 2 530 most recommended may be displayed to be distinguished from other messages, for example, the answer message 1 520 and the answer message 3 540. On the screen 500, the answer message 2 530 is indicated with a relatively thick line than those of the other messages, for example, the answer message 1 520 and the answer message 3 540.

Also, depending on example embodiments, a preset reward may be provided to a second user having created an answer message most recommended or selected by a first user having created a corresponding query message. For example, the reward may be virtual currency or items available in the instant messaging service and/or services linked with the instant messaging service.

Figure 6:
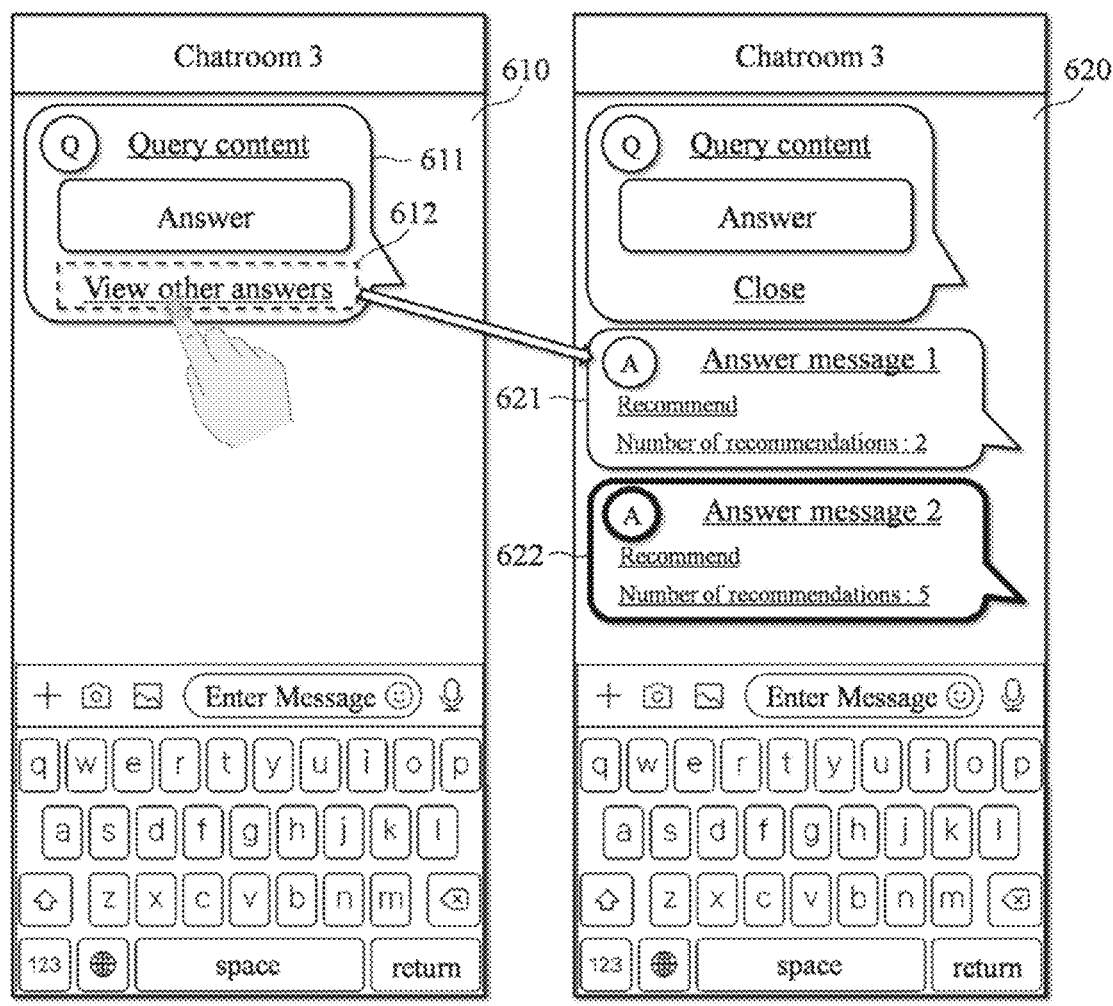
FIG. 6 illustrates another example of providing a feedback about an answer message according to at least one example embodiment.

FIG. 6 illustrates another example of providing a feedback about an answer message according to at least one example embodiment. FIG. 6 illustrates examples of a first screen 610 and a second screen 620 of chatroom 3 of a second user. Here, the first screen 610 represents an example in which a forwarded query message 611 is displayed in the chatroom 3. The query message 611 may include a user interface for viewing other answer messages created for the corresponding query message 611. For example, referring to a first box 612 indicated with dotted lines on the first screen 610, a link "view other answers" for displaying other answer messages created for the query message 611 is set. In response to a selection from the user on the link "view other answers," the first screen 610 of the chatroom 3 may be switched to the second screen 620 and answer messages 621 and 622 created for the query message 611 may be displayed. The second user may verify the answer messages 621 and 622 that are already created for the query message 611 regardless of creating an answer to the query message 611, or to create the answer to the query message 611. Also, the second user may recommend contents of the answer messages 621 and 622. Even in this case, a most recommended message, for example, the answer message 622 to the query message 611, may be displayed to be distinguished from other answer messages, for example, the answer message 621 to the query message 611.

Figure 7:
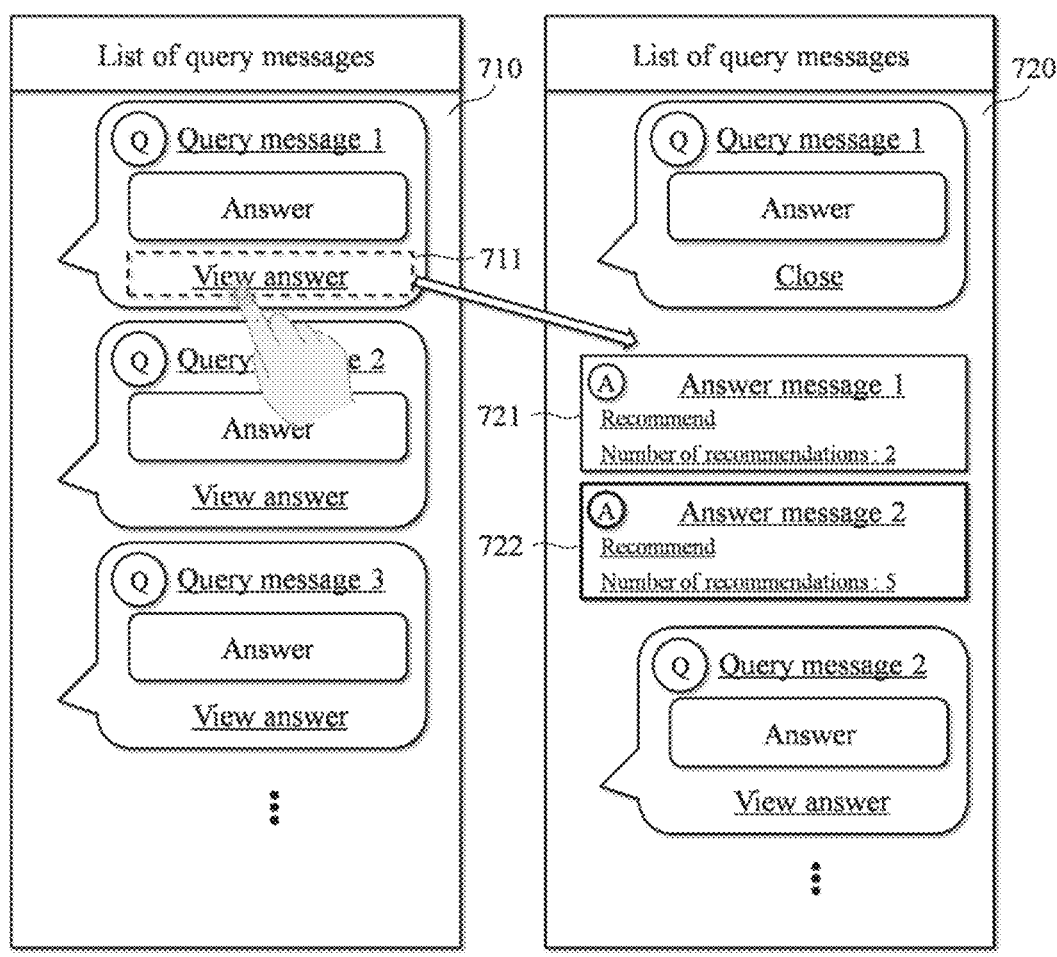
FIG. 7 illustrates another example of providing a feedback about an answer message according to at least one example embodiment.

FIG. 7 illustrates another example of providing a feedback about an answer message according to at least one example embodiment. FIG. 7 illustrate examples of a first screen 710 and a second screen 720 for a page on which a list of query messages is displayed. Here, the first screen 710 represents an example in which query messages are displayed and each of the query messages includes a user interface for viewing an answer posted to a corresponding query message. For example, referring to a first box 711 indicated with dotted lines on the first screen 710, a link "view answers" for displaying answer messages created for "query message 1" is set. If any user connected to a page selects the link "view answers," the first screen 710 of the page is switched to the second screen 720 and answer messages 721 and 722 created for the "query message 1" may be displayed on the second screen 720. That is, any user connected to the page may create an answer to at least one query message among the displayed query messages and may view answers created by other users. Also, any user connected to the page may recommend a desired answer message among the answer messages. In this case, a most recommended answer message may be displayed to be distinguished from other answer messages.

Figure 8:
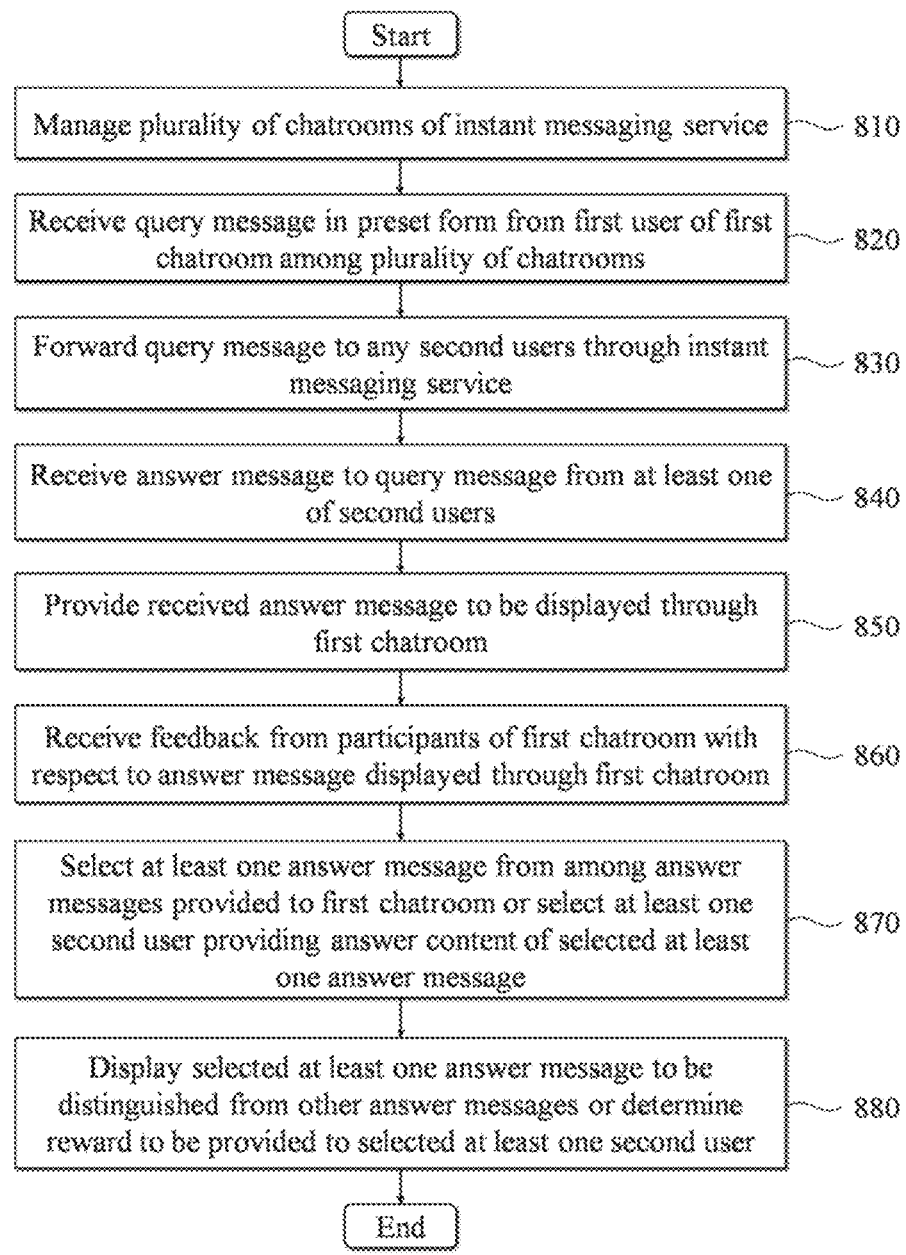
FIG. 8 is a flowchart illustrating an example of an answer message providing method of a server according to at least one example embodiment.

FIG. 8 is a flowchart illustrating an example of an answer message providing method of a server according to at least one example embodiment. The answer message providing method according to the example embodiment may be performed by the computer apparatus 200 that implements the server. For example, the server may be a system that provides an instant messaging service to a terminal of a user. For example, the processor 220 of the computer apparatus 200 may be configured to execute a control instruction according to a code of at least one program or a code of an OS included in the memory 210. Here, the processor 220 may control the computer apparatus 200 to perform operations 810 to 880 included in the answer message providing method of FIG. 8 in response to a control instruction provided from a code stored in the computer apparatus 200.

Referring to FIG. 8, in operation 810, the computer apparatus 200 may manage a plurality of chatrooms of the instant messaging service. For example, the computer apparatus 200 may be a physical device for configuring a server that provides the instant messaging service to a plurality of users, and may manage a plurality of chatrooms opened by users. In detail, for example, the computer apparatus 200 may manage a plurality of chatrooms by storing an identifier of each of the plurality of chatrooms, identifiers of users joining each of the plurality of chatrooms, and identifiers of messages sent or received in each of the plurality of chatrooms to be associated with one another. Here, the computer apparatus 200 may route messages such that each of messages sent and received in chatrooms through the instant messaging service may be forwarded to a user of an appropriate destination.

In operation 820, the computer apparatus 200 may receive a query message in a preset form from a first user of a first chatroom among the plurality of chatrooms. The first user may be one of participants joining the first chatroom. As a query message is sent to the server through a query function provided from the first chatroom, the computer apparatus 200 may receive the query message. The query message may be in a preset form. The preset form may not be particularly limited if it is a form for distinguishing the query message from general messages sent and received in the first chatroom.

In operation 830, the computer apparatus 200 may forward the query message to any second users through the instant messaging service. Here, the second users may be a plurality of unspecific users from perspective of the first user. On the contrary, in the computer apparatus 200 that configures the server, the second users may be a plurality of specific users or a plurality of unspecific users depending on example embodiments. In one example embodiment, the computer apparatus 200 may select the second users from among users of the instant messaging service and may open second chatrooms joined by the selected second users, respectively. For example, ten second chatrooms may be opened for ten second users, respectively. Here, by forwarding the query message to each of the second chatrooms, the query message may be forwarded to each of the second users. In this case, the second users may be a plurality of specific users from perspective of the computer apparatus 200, and may be a plurality of unspecific users from perspective of the first user. Also, the computer apparatus 200 may allocate a query field of the query message by analyzing content of the query message or may allocate the query field of the query message in response to an input or a selection from the first user to select the second users, and may select, as the second users, users to which the allocated query field is designated as a special field. For example, in the case of creating a query message, the first user may input or select a query field of the corresponding query message. If the first user does not input or select the query field, the computer apparatus 200 may allocate the query field by directly analyzing the query message. In another example embodiment, the computer apparatus 200 may create a page for displaying query messages in the instant messaging service and may provide the query messages to a plurality of unspecific users accessing the page through the page. Description related to the page is made above with reference to FIG. 5. In this case, the second users may be a plurality of unspecific users from perspective of both the first user and the computer apparatus 200. To create the page, the computer apparatus 200 may allocate the query field of the query message by analyzing content of the query message or may allocate the query field of the query message in response to an input or a selection from the first user and may create the page such that the query messages may be distinguishably displayed for each allocated query field.

In operation 840, the computer apparatus 200 may receive an answer message to the query message from at least one of the second users. Not all of the second users receiving the query message do not create an answer message. That is, since whether to create an answer message is determined by the second users, a number of answer messages may be variable and an answer message may be absent depending on example embodiments. If any second user creates and sends an answer message, the computer apparatus 200 may receive the answer message.

In operation 850, the computer apparatus 200 may provide the received answer message to be displayed through the first chatroom. For example, referring to the fifth screen 360 of FIG. 3, the answer message may be displayed through the first chatroom in which the corresponding query message is created. Here, the answer message may be displayed in association with the query message in the first chatroom. If the query message is not displayed due to a large number of messages sent and received in the chatroom, the query message or query content included in the query message may be further displayed together when displaying an answer message. Depending on example embodiments, the computer apparatus 200 may further display an answer message in association with the query message displayed on the page. That is, second users accessing the page may also verify answers of other second users on the page.

In operation 860, the computer apparatus 200 may receive a feedback from participants of the first chatroom with respect to the answer message displayed through the first chatroom. The feedback may occur through "recommend" described above with reference to FIG. 5. The computer apparatus 200 may manage a number of recommendations with respect to each of the answer messages.

In operation 870, the computer apparatus 200 may select at least one answer message from among answer messages provided to the first chatroom or may select at least one second user providing answer content of the selected at least one answer message, based on the feedback. For example, an answer message corresponding to a largest number of recommendations may be selected. Alternatively, a second user providing answer content of the answer message corresponding to the largest number of recommendations may be selected. Depending on example embodiments, selecting of the answer message or the second user may be performed in response to a selection from a first user having created a corresponding query message.

In operation 880, the computer apparatus 200 may display the selected at least one answer message to be distinguished from other answer messages or may determine a reward to be provided to the selected at least one second user. An example of displaying the selected answer message to be distinguished from the other answer messages is described above with reference to FIG. 5. Also, as described above, a virtual currency or item may be provided to the second user as a reward.

Figure 9:
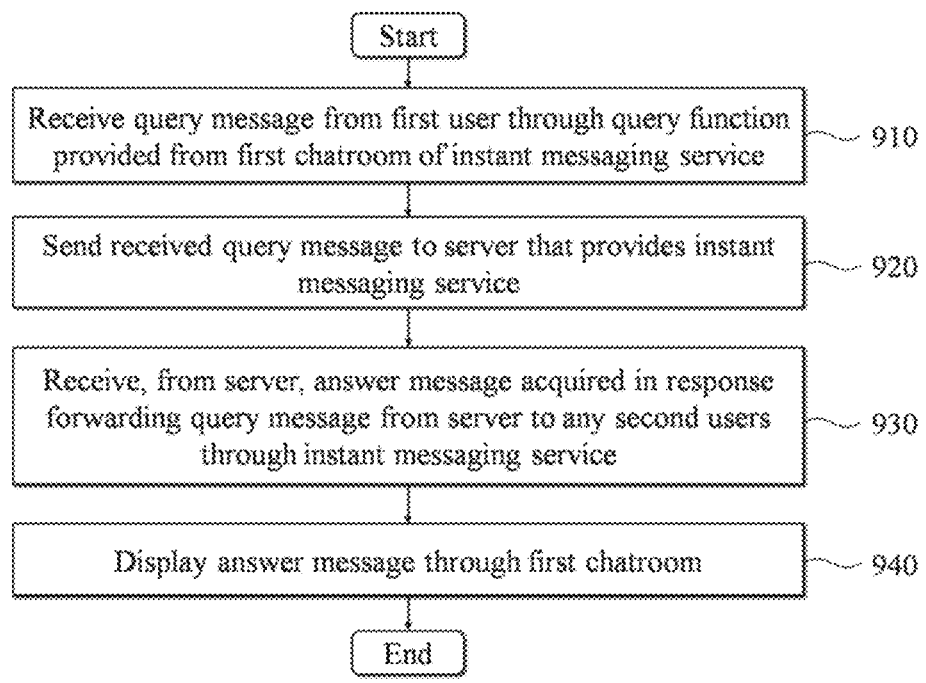
FIG. 9 is a flowchart illustrating an example of an answer message providing method of a client according to at least one example embodiment.

FIG. 9 is a flowchart illustrating an example of an answer message providing method of a client according to at least one example embodiment. The answer message providing method according to the example embodiment may be performed by the computer apparatus 200 that implements a terminal of a user. For example, the processor 220 of the computer apparatus 200 may be configured to execute a control instruction according to a code of at least one program or a code of an OS included in the memory 210. Here, the processor 220 may control the computer apparatus 200 to perform operations 910 to 940 included in the method of FIG. 9 in response to a control instruction provided from a code stored in the computer apparatus 200.

Referring to FIG. 9, in operation 910, the computer apparatus 200 may receive a query message from a first user through a query function provided from a first chatroom of an instant messaging service. For example, an example in which a user activates a query function by pressing the button 311 for receiving the query function is described above with reference to FIG. 3.

In operation 920, the computer apparatus 200 may send the received query message to a server that provides the instant messaging service. The query message may be in a preset form to be distinguished from general messages and may be sent to the server in the same manner as the general messages. Here, the server may process the query message to be different from the general messages through the preset form of the query message. As described above with FIG. 6, the server may forward the query message to any second users through the instant messaging service, may receive an answer message to the query message from at least one of the second users, and may provide the received answer message to be displayed through the first chatroom.

In operation 930, the computer apparatus 200 may receive, from the server, an answer message acquired in response to forwarding the query message from the server to any second users through the instant messaging service. For example, the second users may include users selected from among users of the instant messaging service based on a query field of the query message, the query message may be forwarded to each of the second chatrooms opened for the second users, respectively, and the answer message may be created to include answer content input from each of the second users to the corresponding second chatroom. As another example, the query message may be displayed through a page created in the instant messaging service, and the second users may include a plurality of unspecific users accessing the page. Here, if the second users input answer contents to the query message displayed through the page, answer messages including the input answer contents may be forwarded to the computer apparatus 200 through the server.

In operation 940, the computer apparatus 200 may display the answer message through the first chatroom. Therefore, participants of the first chatroom may receive answer messages to the query message. Also, as described above with reference to FIG. 5, the participants of the first chatroom may recommend a desired answer message among the answer messages and a best answer message or a best answerer may be selected based on a number of recommendations. The best answer message may be displayed to be distinguished from other answer messages and a preset reward may be provided to the best answerer.

Figure 10:
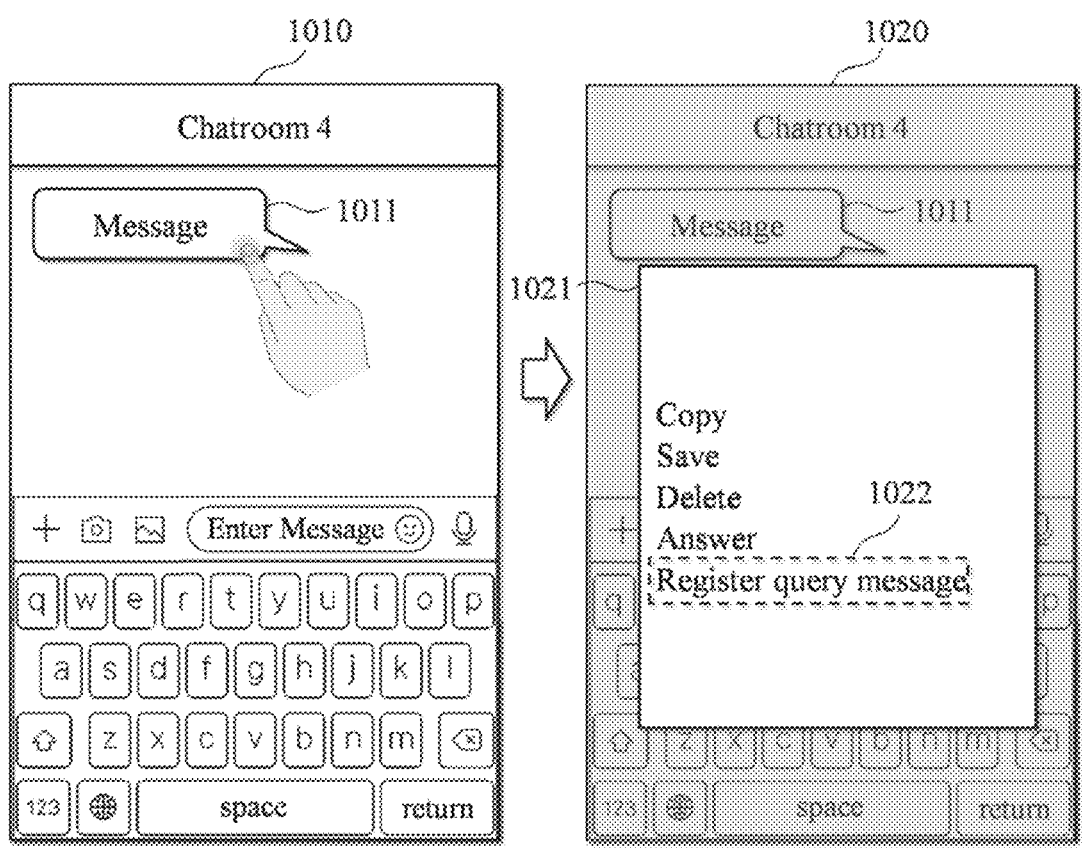
FIG. 10 illustrates an example of registering a query message according to at least one example embodiment.

FIG. 10 illustrates an example of registering a query message according to at least one example embodiment. FIG. 10 illustrate examples of a first screen 1010 and a second screen 1020 of chatroom 4. The first screen 1010 represents an example in which a message 1011 is displayed in the chatroom 4. Here, in response to an occurrence of a preset gesture, such as a touch gesture, performed on an area displayed on the message 1011 during at least a predetermined (or, alternatively, desired) period of time, a user interface 1021 associated with the message 1011 may be provided on the second screen 1020. The user interface 1021 may include various functions of copying, saving, and deleting content of the message 1011. Here, in the example embodiment, the user interface 1021 may include a function for registering the message 1011 as a query message as shown in a box 1022 indicated with dotted lines.

As described above, a function for registering, as a query message, a message desired by the user among messages sent and received in chatrooms may be provided to the user. As described above, the registered query message may be forwarded to the plurality of unspecific users through various paths to acquire an answer message.

Figure 11:
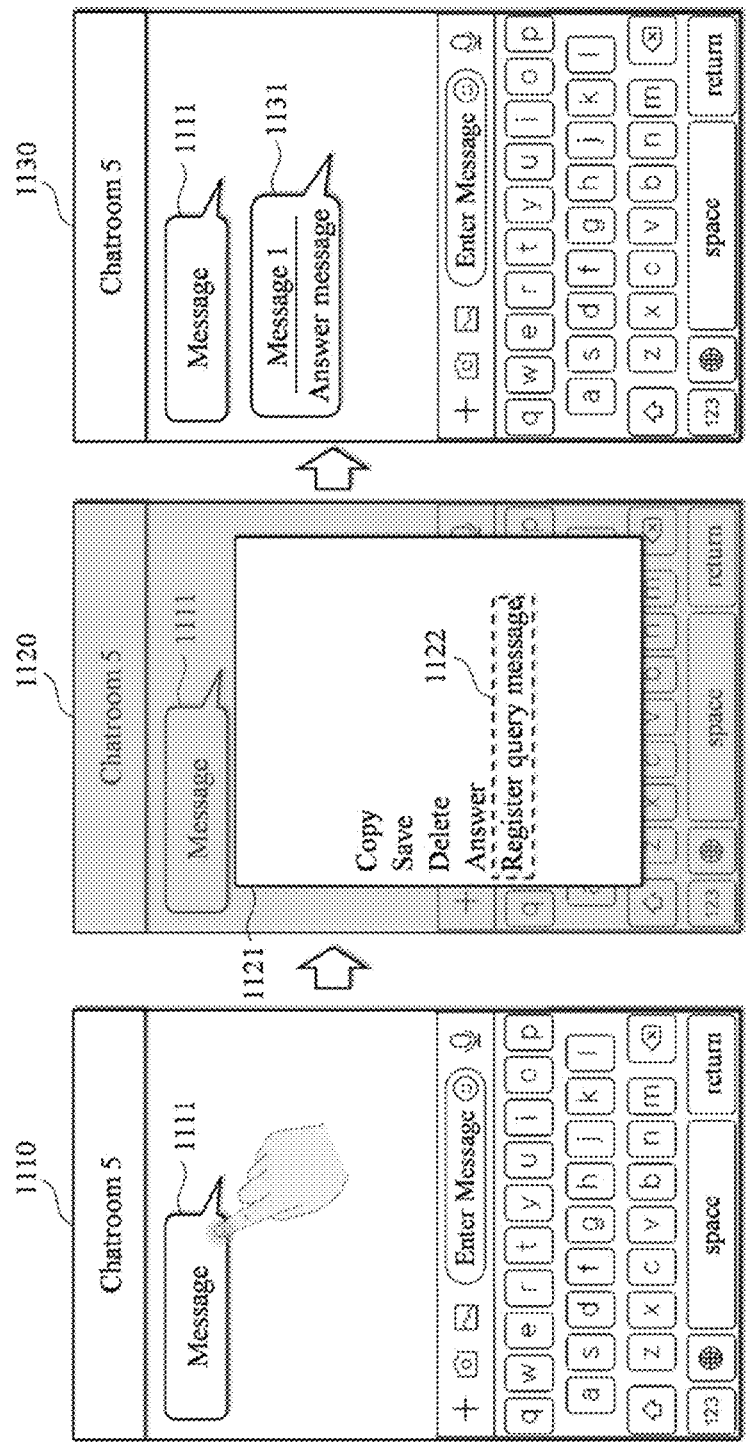
FIG. 11 illustrates another example of registering a query message according to at least one example embodiment.

FIG. 11 illustrates another example of registering a query message according to at least one example embodiment. FIG. 11 illustrate examples of a first screen 1110, a second screen 1120, and a third screen 1130 of chatroom 5. The first screen 1110 represents an example in which a message 1 1111 is displayed in the chatroom 5. Here, in response to an occurrence of a preset gesture, such as a touch gesture, performed on an area displayed on the message 1 1111 during at least a predetermined (or, alternatively, desired) period of time, a user interface 1121 associated with the message 1 1111 may be provided on the second screen 1120. The user interface 1121 may include various functions of copying, saving, and deleting content of the message 1 1111. Here, in the example embodiment, the user interface 1121 may include a function for creating an answer to the message 1 1111. The third screen 1130 represents an example in which an answer message 1131 to the message 1 1111 is displayed. In this case, the server that provides the instant messaging service to the terminal of the user may analyze content of at least one of the message 1 1111 and the answer message 1131 and may register the message 1 1111 as a query message.

That is, that an answer message to a specific message is input may represent that a probability that the specific message includes a query is relatively high. Accordingly, the server may analyze content of at least one of the specific message and the answer message, and may automatically register the specific message as a query message. For example, if onomatopoeia is input as an answer to a specific message, a probability that the specific message includes a query is relatively low. On the contrary, if an answer message includes a description related to a specific subject, a probability that the specific message includes a query related to the corresponding subject is relatively high. As another example, if content of a specific message includes a representation using a question mark or an interrogative form, a probability that the specific message includes a query is relatively high. As described above, the server may analyze content of the specific message and/or content of the answer message and may automatically register the specific message as a query message.

As described above, various functions for registering a corresponding message as a query message may be provided even with respect to a general message already sent and received.

According to some example embodiments, since a query created in a chatroom of an instant messaging service is forwarded to a plurality of unspecific users using an instant messaging service through the instant messaging service and answers each in a form of an answer message from the plurality of unspecific users are forwarded to the chatroom in which the query is created, users may send and receive queries and answers with the plurality of unspecific users in the chatroom.

The systems or the apparatuses described herein may be implemented using hardware components, software components, and/or a combination thereof. For example, the apparatuses and components may be implemented using one or more general-purpose or special purpose computers, such as, for example, a processor, a controller, an arithmetic logic unit, a digital signal processor, a microcomputer, a field programmable gate array (FPGA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, and computer storage medium or device, to provide instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Also, examples of other media may include app stores that distribute applications, sites that supply and distribute a variety of software, and record media and storage media managed by a server. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An answer message providing method of a computer apparatus comprising at least one processor, the method comprising:
   by the at least one processor,
   managing a plurality of chatrooms in which users of an instant messaging service are able to participate;
   receiving a query message in a preset form from a first user device of a first user of the users through a first chatroom of the plurality of chatrooms in which the first user is participating;
   selecting a second user, of the users, that is not participating in the first chatroom;
   forwarding the query message to a second user device of the second user such that the query message is displayed through a second chatroom in which the second user is participating;
   receiving at least one answer message to the displayed query message from the second user device through the second chatroom while the second user is not participating in the first chatroom; and
   forwarding the at least one answer message to the first user device such that the at least one answer message is displayed through the first chatroom.

2. The method of claim 1, wherein the selecting of the second user comprises:
   allocating a query field of the query message by analyzing content of the query message or allocating the query field of the query message in response to an input or a selection from the first user; and
   selecting, as the second user, a user to which the allocated query field is designated as a special field.

3. The method of claim 1, further comprising:
   creating a page outside of the first chatroom and that is accessible by a plurality of unspecific users; and
   displaying the query message on the page.

4. The method of claim 3, wherein the creating of the page comprises:
   allocating a query field of the query message by analyzing content of the query message or allocating the query field of the query message in response to an input or a selection from the first user; and
   creating the page such that the query message is distinguishably displayed by the displaying for each allocated query field.

5. The method of claim 3, further comprising:
   by the at least one processor,
   displaying the at least one answer message in association with the query message on the page.

6. The method of claim 1, wherein the at least one answer message is displayed in association with the query message in the first chatroom.

7. The method of claim 1, further comprising:
   by the at least one processor,
   receiving a feedback from participants of the first chatroom with respect to the at least one answer message displayed through the first chatroom; and
   selecting at least one answer message from among the at least one answer message, based on the feedback.

8. The method of claim 7, wherein the at least one answer message includes a plurality of answer messages, and the method further comprising:
   by the at least one processor,
   displaying the selected at least one answer message so as to be distinguished from other answer messages of the plurality of answer messages.

9. An answer message providing method of a computer apparatus comprising at least one processor, the method comprising:
   by the at least one processor,
   managing a plurality of chatrooms in which users of an instant messaging service are able to participate;
   receiving a query message in a preset form from a first user device of a first user of the users through a first chatroom of the plurality of chatrooms in which the first user is participating;
   selecting second users, of the users, that are not participating in the first chatroom;
   forwarding the query message to second user devices of the second users, respectively, such that the query message is displayed through a second chatroom in which the second users are participating;
   receiving at least one answer message to the displayed query message from at least one second user device of the second user devices of at least one second user of the second users, respectively, through the second chatroom while the at least one second user is not participating in the first chatroom; and
   forwarding the at least one answer message to the first user device such that the at least one answer message is displayed through the first chatroom.

10. A non-transitory computer-readable record medium storing instructions that, when executed by a processor, cause the processor to perform the method of claim 1.

11. A computer apparatus comprising:
    at least one processor configured to execute computer-readable instructions,
    wherein the at least one processor is further configured to:
    manage a plurality of chatrooms in which users of an instant messaging service are able to participate,
    receive a query message in a preset form from a first user device of a first user of the users through a first chatroom of the plurality of chatrooms in which the first user is participating,
    select a second user, of the users, that is not participating in the first chatroom, forward the query message to a second user device of the second user such that the query message is displayed through a second chatroom in which the second user is participating, receive an answer message to the displayed query message from the second user device through the second chatroom while the second user is not participating in the first chatroom, and forwarding the answer message to the first user device such that the answer message is displayed through the first chatroom.

12. The computer apparatus of claim 11, wherein the at least one processor is further configured to create a page outside of the first chatroom and that is accessible by a plurality of unspecific users, and display the query message on the page.

13. A non-transitory computer-readable record medium storing instructions that, when executed by a processor, cause the processor to perform the method of claim 9.

* * * * *